US012546076B2

(12) United States Patent
Gil-Casares Armada et al.

(10) Patent No.: US 12,546,076 B2
(45) Date of Patent: Feb. 10, 2026

(54) BREAKWATER

(71) Applicant: ARENA SYSCOM CONSULTING, S.L., Madrid (ES)

(72) Inventors: Santiago Gil-Casares Armada, Madrid (ES); Alvaro Gil-Casares Armada, Madrid (ES)

(73) Assignee: ARENA SYSCOM CONSULTING, S.L., Madrid (ES)

( * ) Notice: Subject to any disclaimer, the term of this patent is extended or adjusted under 35 U.S.C. 154(b) by 108 days.

(21) Appl. No.: 18/573,042

(22) PCT Filed: Jun. 13, 2022

(86) PCT No.: PCT/ES2022/070370
§ 371 (c)(1),
(2) Date: Dec. 21, 2023

(87) PCT Pub. No.: WO2022/269112
PCT Pub. Date: Dec. 29, 2022

(65) Prior Publication Data
US 2024/0295093 A1    Sep. 5, 2024

(30) Foreign Application Priority Data

Jun. 22, 2021  (ES) .............................. ES202130586

(51) Int. Cl.
*E02B 3/06*  (2006.01)
(52) U.S. Cl.
CPC .................... *E02B 3/062* (2013.01)
(58) Field of Classification Search
CPC .................... E02B 3/06; E02B 3/062
See application file for complete search history.

(56) References Cited

U.S. PATENT DOCUMENTS

| 5,120,156 A | * | 6/1992 | Rauch | ....................... E02B 3/06 |
| | | | | 405/25 |
| 5,246,307 A | * | 9/1993 | Rauch | ....................... E02B 3/06 |
| | | | | 405/25 |

(Continued)

FOREIGN PATENT DOCUMENTS

| CN | 105696516 A | 6/2016 |
| CN | 108755573 A | 11/2018 |

(Continued)

OTHER PUBLICATIONS

International Search Report issued in corresponding PCT application No. PCT/ES2022/070370 mailed Oct. 27, 2022 (5 pages).

(Continued)

*Primary Examiner* — Kyle Armstrong
(74) *Attorney, Agent, or Firm* — Osha Bergman Watanabe & Burton

(57) ABSTRACT

The breakwater according to the present invention is formed from a body on which the waves hit, and comprising a plurality of surfaces, each of which has a different inclination, said inclinations defining different angles with respect to the horizontal. The angle defined by each surface increases from the front surface to the rear surface, and the length of each surface is different, decreasing from the front surface to the rear surface. It allows to provide a breakwater in which most of the wave energy returns to the sea, so that only a small part is dissipated in the breakwater.

13 Claims, 4 Drawing Sheets

(56) References Cited

U.S. PATENT DOCUMENTS 6,935,808 B1    8/2005  Dempster
8,747,023 B1 *  6/2014  Walker .................... E02B 3/046
                                                  405/23

FOREIGN PATENT DOCUMENTS

| CN | 111676900 A     | 9/2020  |
|----|-----------------|---------|
| CN | 211735252 U     | 10/2020 |
| CN | 112160284 A     | 1/2021  |
| EP | 1865112 A1      | 12/2007 |
| KR | 10-2014-0106971 A | 9/2014 |

OTHER PUBLICATIONS

Written Opinion issued in corresponding PCT application No. PCT/ES2022/070370 mailed Oct. 27, 2022 (5 pages).

* cited by examiner

BREAKWATER

FIELD OF INVENTION

The present invention relates to a breakwater, which allows most of the wave energy to return to the sea, whereby only a small part is dissipated in the breakwater.

BACKGROUND OF THE INVENTION

A breakwater is a coastal structure whose main purpose is to protect the coast or a port from the action of the waves of the sea or the weather. They are usually calculated for a certain wave height with a specified return period.

A breakwater is designed to cause a reduction in the intensity of the waves and its design is based, mainly, on building a mountain through the accumulation of materials with different sizes. Part of that mountain will be submerged and another part will be emerged.

A large part of the waves break in the part that is submerged, and in this way they lose strength. The rest of the energy continues its path until it collides with the part that is emerged.

Currently known breakwaters have several important disadvantages.

First, the forces that the wave produces when breaking are several times greater than if the wave does not break.

In addition, the air trapped in the turbulence that is produced when breaking is very destructive.

On the other hand, fixed breakwaters produce a great environmental impact, since they prevent the passage of currents and change the configuration of the coast that protect and cause a great visual impact.

DESCRIPTION OF THE INVENTION

Therefore, an objective of the present invention is to provide a breakwater in which most of the wave energy returns to the sea, whereby only a small part is dissipated in the breakwater.

With the breakwater of the invention it is possible to solve the aforementioned drawbacks, presenting other advantages that will be described below.

The breakwater according to the present invention comprises a body on which the waves hit, in which the body on which the waves hit comprises a plurality of surfaces, each of which has a different slope, said slopes defining different angles with respect to the horizontal.

Advantageously, the surfaces are:
a front surface;
a plurality of intermediate surfaces; and
a rear surface.

Preferably, the angle defined by each surface increases from the front surface to the rear surface.

Furthermore, the length of each surface is preferably different, and the length of each surface decreases from the front surface to the rear surface.

According to a preferred materialization the angle defined by the front surface is between 20° and 30°, the angles defined by the intermediate surfaces are between 45° and 80°, and/or the angle defined by the rear surface is 90°.

According to a preferred materialization the body has a height between 1 and 30 meters, the length of the front surface is between 50% and 100% of the total height of the body, the lengths of the intermediate surfaces are between 20% and 50% of the total body height, and the length of the rear surface is between 2 meters and 6 meters.

Advantageously, said body on which the waves hit comprises a chamber, located in a rear position, and some side floats and/or a rear float, which can be filled with water or air, with water to submerge them to the depth of use. and air can be injected inside, dislodging the water so that the breakwater floats and is easily towed by a tugboat to its location.

In the breakwater according to the present invention, said body may comprise fastening elements, such as chains, to fasten it to a seabed.

According to a preferred materialization, the front surface has a slope such that the corresponding Iribarren number is greater than 2.3, the Iribarren number being defined according to the following formula:

$$NI = P \times 1,25 / \sqrt{H \times T}$$

where:
NI is the Iribarren number;
P It is the slope of the beach where the breakwater is placed;
H is the height of the waves that are expected to hit the body; and
T is the period of the waves that are expected to hit the body.

The breakwater according to the present invention is based on preventing the wave from breaking, so that it has an end of the oscillation or undertow type, called "surging"

This end occurs naturally when the beach or surface where the wave ends has a slope such that the number of Iribarren corresponding to said wave is greater than 2.3.

As previously indicated, the number of Iribarren depends on the slope of the beach and the height and period/length of the arriving wave.

$$\text{Iribarren number} = \text{slope of the beach} \times 1,25 / \sqrt{H \times T}$$

Where:
H is the height of the wave; and
T is the period of the wave.

By preventing the wave from breaking, the breakwater according to the present invention ensures that most of the wave energy returns to the sea, whereby only a small part is dissipated in the breakwater.

The shape of the breakwater according to the present invention seeks to redirect the movement of the wave in a vertical direction, preventing it from breaking.

To do this, the wave is allowed to enter at one end, and the shape of the breakwater forces the wave to change direction, so that it enters horizontally, exits vertically and returns backwards.

In a very simplified form, and in an approximate way, depending on the type of wave and the depth, it is obtained:
An energy attenuation of 85%-95%, the wave passing the breakwater having an energy of 15%-5% (1/7-1/20) of that arriving;
A reflected energy of 60%-70% (4/7-5/7) (Backwash)
15%-30% (1/7-2/7) energy dissipated, with 15% (1/7) dissipated in breakwater and friction movements, and 15% (1/7) dissipated in movements of anchor chain It should be noted that the shape of the breakwater according to the present invention increases the speed of the water in its interior, which produces a suction effect in the lower part, which affects the part of the wave that passes below the breakwater. In this way, the theoretical attenuation is significantly increased.

Assuming an attenuation of 85%, that the period of the wave passing the breakwater has the same frequency as the arriving wave, and the wave energy being proportional to the square of the height:

a 1 meter wave would become a 30 cm wave.
a 2 meter wave would become a 75 cm wave.
a 3 meter wave would become a 1.20 m wave.
a 4 meter wave would become a 1.50 m wave.

The breakwater according to the present invention can be used in fixed (supported) or floating installations.

In fixed or supported installations, a simple solution is the placement on piles of a resistant prefabricated metal or concrete structure, the piles being behind the breakwater and protected by the breakwater itself.

The pile driving works are much faster and less invasive than the construction of a traditional breakwater.

The breakwater does not need to rest on the ground, so currents can continue to pass under the breakwater with significantly less ecosystem disturbance than traditional breakwaters.

With regard to visual impact, at high tide, the breakwater is completely submerged, and the part that protrudes at low tide depends on the tide run.

In floating installations, the breakwater according to the present invention achieves wave attenuation results similar to the breakwater in fixed installations (85%-95%), unlike currently known floating breakwaters, with minimal visual impact.

In addition, it is possible to move around very easily, as it is a partially submersible installation.

In particular, the body can be emptied, so it is very easy to move the floating breakwater, from one place to another, floating like a ship. This is particularly interesting for applications where a permanent breakwater is not required, for example for the construction and maintenance of offshore wind farms.

BRIEF DESCRIPTION OF THE DRAWINGS

For a better understanding of what has been stated, some drawings are attached in which, schematically and only as a non-limiting example, a practical case of materialization is represented.

DESCRIPTION OF A PREFERRED MATERIALIZATION

Figure 1:
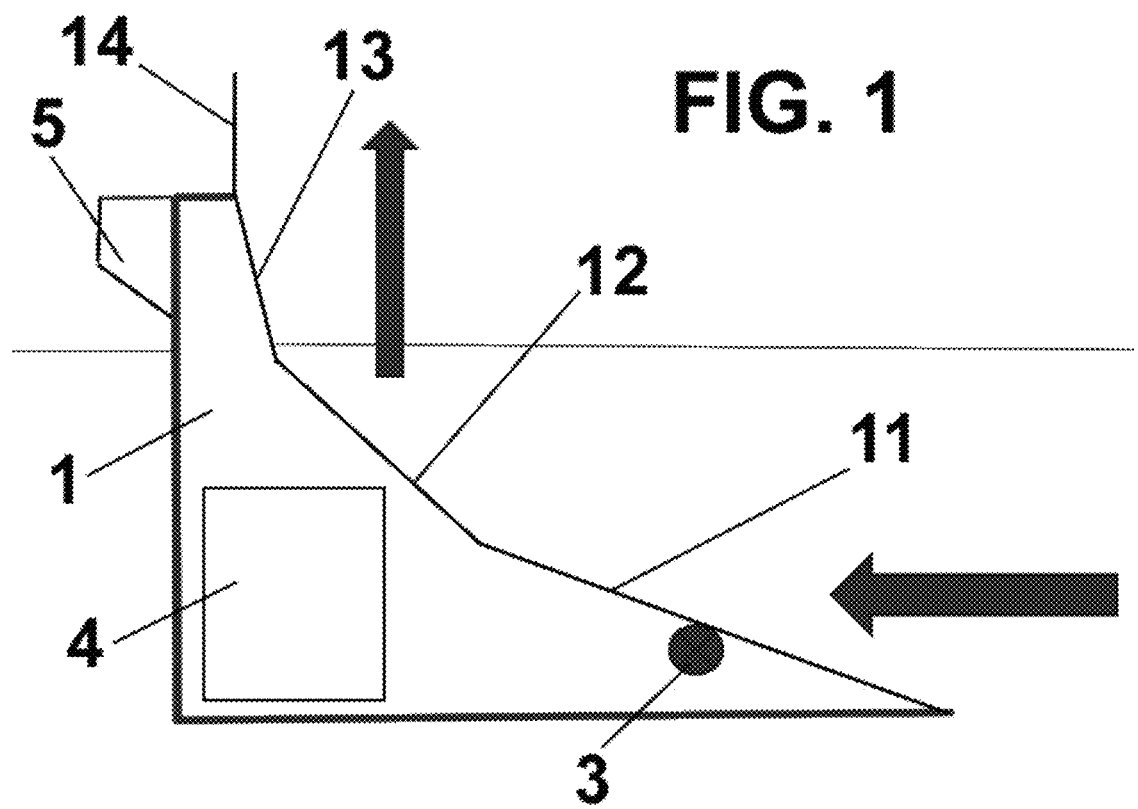
FIG. 1 is a side view of the breakwater in accordance with the present invention.
Figure 2:
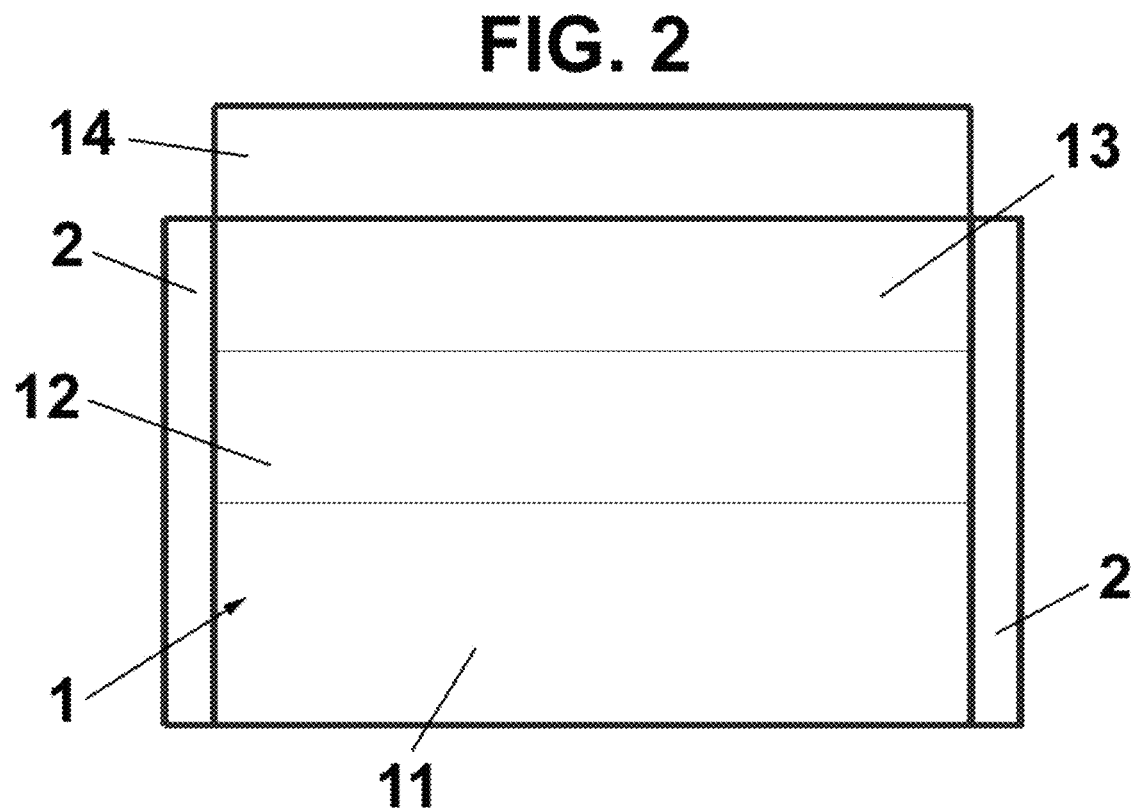
FIG. 2 is a front view of the breakwater in accordance with the present invention.

As shown in FIGS. 1 and 2, the breakwater according to the present invention is formed from a body (1) on which the waves hit, and comprising a plurality of surfaces (11, 12, 13, 14), four in the materialization shown, each of which has a different inclination, said inclinations defining different angles with respect to the horizontal.

According to the represented materialization, the surfaces are:

a front surface (11);
a plurality of intermediate surfaces (12, 13); Y
a rear surface (14)

However, it should be noted that there may be a single intermediate surface or more than two intermediate surfaces.

As can be seen in FIG. 1, the angle defined by each surface (11, 12, 13, 14) increases from the front surface (11) to the rear surface (14), and the length of each surface (11, 12, 13, 14) is different, decreasing from the front surface (11) to the rear surface (14).

According to a non-limiting example, the angle defined by the front surface (11) is between 20° and 30°, for example, 25°, the angles defined by the intermediate surfaces (12, 13) are between 45° and 80°, for example 45° and 70°, and the angle defined by the rear surface (14) is 90°.

For its part, according to a non-limiting example, the length of the front surface (11) is between 5 and 7 meters, for example, 6 meters, the lengths of the intermediate surfaces (12, 13) are between 3 and 2 meters, for example 2.8 meters and 2.1 meters, and the length of the rear surface (14) is 2 meters or less.

Furthermore, said body (1) comprises side floats (2) and fastening elements (3), to fasten it to a seabed.

The front surface (11), which is the surface where the wave hits first, has a slope such that the corresponding Iribarren number is greater than 2.3, defining the Iribarren number according to the following formula:

$$NI = P \times T \times 1.25 / \sqrt{H}$$

where:

NI is the Iribarren number;
P is the slope of the beach where the breakwater has been installed;
H is the height of the waves that are expected to hit the body, and
T is the period of the waves expected to hit the body When the breakwater according to the present invention is installed in position, a wave enters through the open front part, encounters a first inclined surface or front surface (11) of 20°-30° with respect to the horizontal, as described above.

Next, the wave meets an intermediate surface (12) of 40°-45°, then an intermediate surface (13), for example, of 60°, then, it could find another intermediate surface of 80°, and finally a vertical rear surface (14).

It should be noted that the body (1), in its rear part, that is to say, in the part opposite to the entrance of the wave, can comprise a chamber (4) that can be filled with water.

This chamber (4) has three missions:

As it is filled with water, the inertia of the assembly increases. The mass of this chamber (4) can be easily increased by extending the body (1) from the rear, if deemed convenient.

In addition, as the water is incompressible, it helps to resist the pressure of the arriving wave, when it hits the inclined surfaces, reinforcing itself from the back On the other hand, when the entry of the wave tries to turn the body (1) downwards, the inertia and the distribution of weights prevent it.

The floatation and rigidity of the assembly are achieved by means of empty side floats (2), and optionally by means of a rear float (5).

Its buoyancy is calculated so that the whole assembly is at the design depth, which is normally completely submerged. The breakwater is intended to protrude from the water as little as possible for environmental reasons.

The breakwater according to the present invention, when it is floating, can be anchored by means of fastening elements (3), such as chains, for example, by means of a single main anchor with its anchoring chain (3) that rests on the bottom. This chain (3) will have a high safety factor.

At the end of this chain there will be a yoke (not represented in the figures) from which 3/5 chains will come out, which will be the ones that connect to the breakwater from the bottom, forming the corresponding catenaries. These chains connect to the lower front part of the breakwater. In addition, one or two rearward-facing side chains hold the position of the breakwater fixed.

It should be noted that the breakwater according to the present invention will normally be positioned at an angle of approximately 10° with the predominant direction of the waves, with three objectives:

Avoid the formation of stationary waves in places where waves are of the swell type Obtain a more stable position by exerting force on the wave in one direction;

Allow to use only one positioning chain instead of two.

Figure 3:
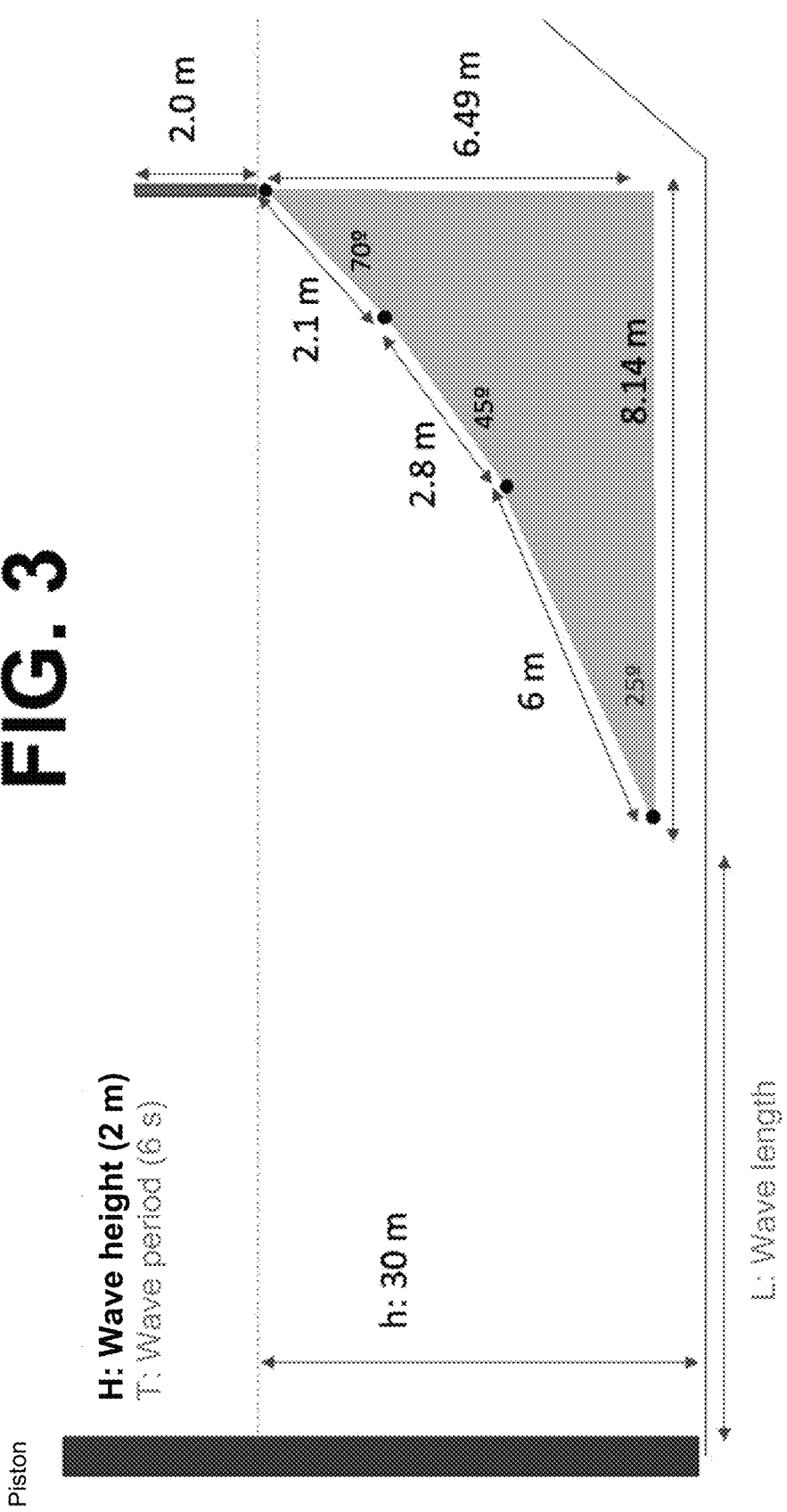
FIG. 3 is a side view of a specific embodiment of the breakwater according to the present invention.

FIG. 3 shows a specific materialization of the breakwater according to the present invention, indicating the values of the inclinations and lengths of each surface.

Figure 4:
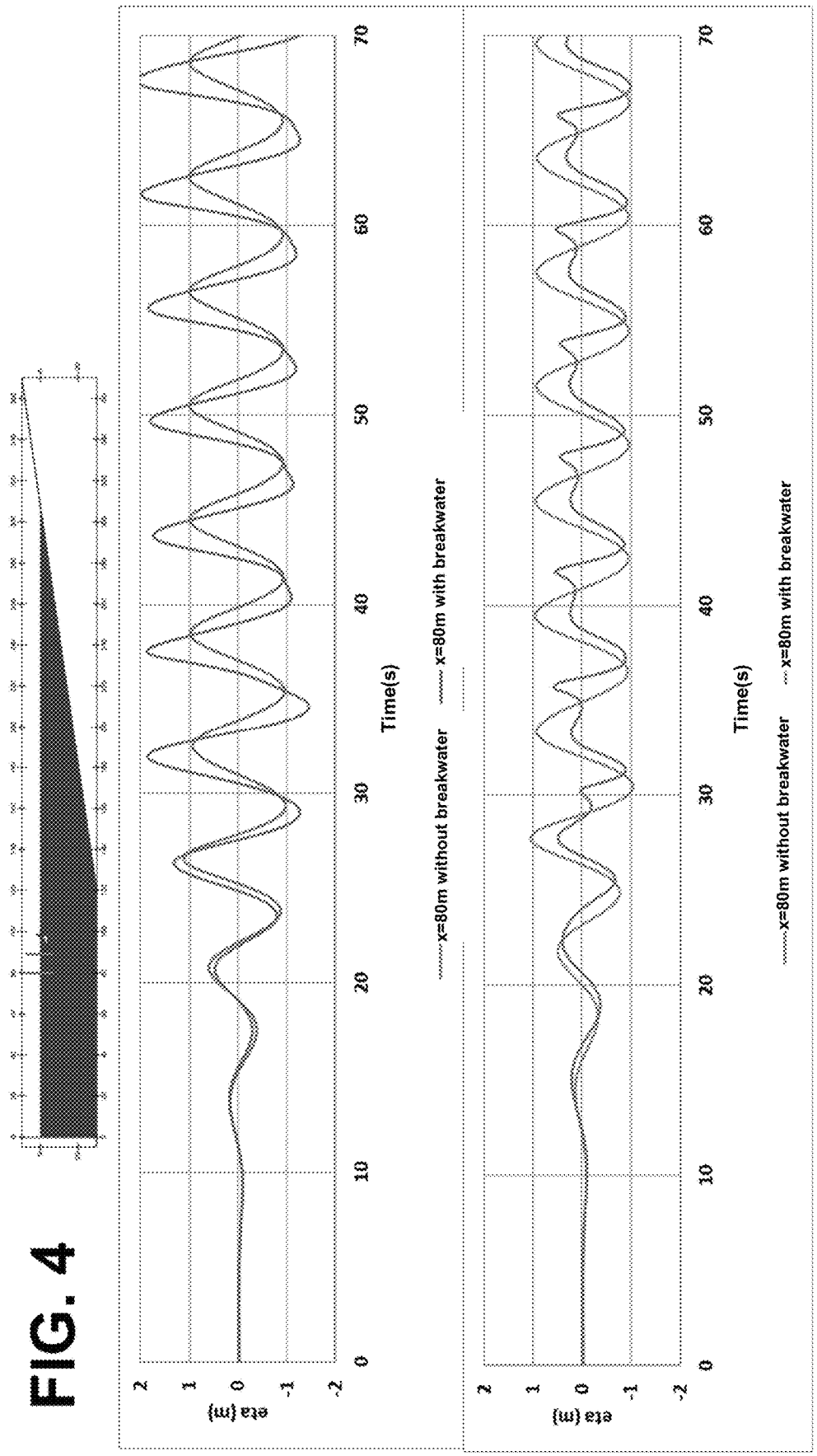
FIGS. 4 and 5 are comparative graphs of the elevations of the water surface as a function of the position of the breakwater according to the present invention
Figure 5:
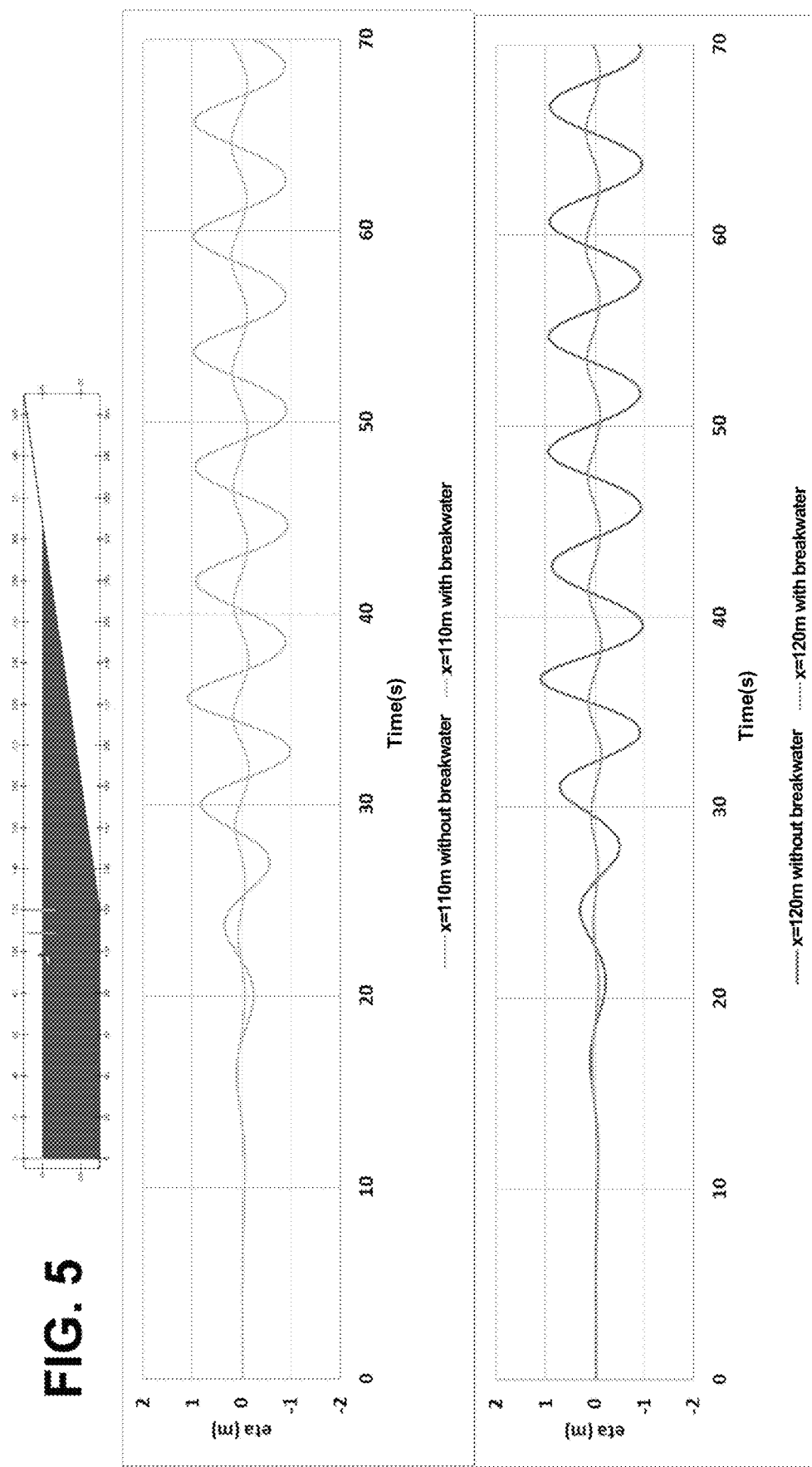

FIGS. 4 and 5 show comparative graphs of the elevations of the water surface as a function of the position of the breakwater according to the present invention, with the values indicated in FIG. 3.

Specifically, in FIG. 4 the elevations of the water surface in positions before the breakwater are indicated, and in FIG. 5 the elevations of the water surface in positions after the breakwater are indicated, where the attenuation effect of the breakwater on the elevation of the water surface.

The invention claimed is:

1. A breakwater device, comprising a body, wherein waves hit the body, wherein the body comprises a plurality of surfaces, wherein each surface comprises a different slope, disposed at different angles with respect to a horizontal plane, the plurality of surfaces comprising:
   a front surface;
   a plurality of intermediate surfaces; and
   a rear surface
wherein the angle of each surface increases from the front surface to the rear surface.

2. The breakwater device according to claim 1, wherein each surface comprises a length of a different value.

3. The breakwater device according to claim 2, wherein the length of each surface decreases from the front surface to the rear surface.

4. The breakwater device according to claim 1, wherein the angle of the front surface is between 20° and 30°.

5. The breakwater device according to claim 1, wherein the angles of the plurality of intermediate surfaces are between 45° and 80°.

6. The breakwater device according to claim 1, wherein the angle of the rear surface is 90°.

7. The breakwater device according to claim 1, wherein the body comprises a total height between 1 and 30 meters.

8. The breakwater device according to claim 7, wherein a length of the front surface is between 50% and 100% of the total height of the body.

9. The breakwater device according to claim 7, wherein a length of each of the plurality of intermediate surfaces are between 20% and 50% of the total height of the body.

10. The breakwater device according to claim 1, wherein the body on which the waves hit comprises a water chamber.

11. The breakwater device according to claim 1, wherein the body comprises side floats and/or a rear float.

12. The breakwater device according to claim 1, wherein the body comprises one or more fastening elements configured to secure it to a seabed.

13. The breakwater device according to claim 1, the breakwater device disposed at a beach, wherein the front surface comprises a slope with a corresponding Iribarren number greater than 2.3, the corresponding Iribarren number defined according to a formula comprising:

$$NI = P \times T \times 1,25 \big/ H^{1/2}$$

wherein:
NI is the corresponding Iribarren number;
P is the-slope of the beach;
H is the-height of the waves; and
T is the-period of the waves.

* * * * *